(12) United States Patent
Kondo et al.

(10) Patent No.: US 12,202,560 B2
(45) Date of Patent: Jan. 21, 2025

(54) VEHICLE BODY TRANSPORT SYSTEM

(71) Applicant: Honda Motor Co., Ltd., Tokyo (JP)

(72) Inventors: Shuhei Kondo, Tokyo (JP); Takahiro Yamashita, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 212 days.

(21) Appl. No.: 18/169,221

(22) Filed: Feb. 15, 2023

(65) Prior Publication Data
US 2023/0294781 A1 Sep. 21, 2023

(30) Foreign Application Priority Data

Mar. 17, 2022 (JP) ................... 2022-042440

(51) Int. Cl.
*B62D 65/02* (2006.01)
*G05D 1/20* (2024.01)
(Continued)

(52) U.S. Cl.
CPC .............. *B62D 65/022* (2013.01); *G06T 7/20* (2013.01); *G06T 7/66* (2017.01); *G05D 1/20* (2024.01);
(Continued)

(58) Field of Classification Search
CPC .... B62D 65/022; B62D 65/18; G05D 1/0212; G05D 1/0231; G05D 1/0246; G05D 1/0263; G05D 1/24; G05D 1/246; G05D 1/249; G05D 1/43; G05D 1/622; G05D 1/633; G05D 1/646; G05D 1/656; G05D 1/693; G05D 2107/70; G05D 2109/10; G05D 2111/10; G06T 7/20; G06T 7/66; G06T 7/246; G06T 2207/30241; G06T 2207/30261; G06T 2207/30108; G06T 2207/30196; G06T 2207/30232
See application file for complete search history.

(56) References Cited

U.S. PATENT DOCUMENTS

2021/0241468 A1* 8/2021 Zhang .................... H04N 7/188
2022/0117218 A1* 4/2022 Sibley ................ B23K 26/0884
(Continued)

FOREIGN PATENT DOCUMENTS

JP        2006123684        5/2006

*Primary Examiner* — Russell Frejd
(74) *Attorney, Agent, or Firm* — JCIPRNET

(57) ABSTRACT

A vehicle body transport system includes an unmanned carrier carrying and transporting a vehicle body between work stations; and an imaging device including an imaging part imaging a traveling route of the unmanned carrier and the surroundings of the traveling route from above, an analysis part analyzing an image captured by the imaging part, and a transmission part transmitting a signal to the unmanned carrier. When a moving object other than the unmanned carrier carrying the vehicle body is present in the image, the analysis part predicts whether a movement trajectory that the vehicle body passes after a predetermined time intersects a movement position where the moving object is located after the predetermined time. When predicting that the movement trajectory and the movement position intersect after the predetermined time, the transmission part transmits an emergency operation signal to the unmanned carrier before the predetermined time elapses.

4 Claims, 11 Drawing Sheets

(51) Int. Cl.
  *G05D 1/249* (2024.01)
  *G05D 1/43* (2024.01)
  *G05D 1/633* (2024.01)
  *G05D 1/646* (2024.01)
  *G05D 1/693* (2024.01)
  *G05D 107/70* (2024.01)
  *G05D 109/10* (2024.01)
  *G05D 111/10* (2024.01)
  *G06T 7/20* (2017.01)
  *G06T 7/66* (2017.01)

(52) U.S. Cl.
  CPC ............... *G05D 1/249* (2024.01); *G05D 1/43* (2024.01); *G05D 1/633* (2024.01); *G05D 1/646* (2024.01); *G05D 1/693* (2024.01); *G05D 2107/70* (2024.01); *G05D 2109/10* (2024.01); *G05D 2111/10* (2024.01); *G06T 2207/30241* (2013.01); *G06T 2207/30261* (2013.01)

(56) References Cited

U.S. PATENT DOCUMENTS

2022/0355482 A1* 11/2022 Denenberg ............... G01V 8/00
2022/0379474 A1* 12/2022 Vu ........................ G01S 17/87
2024/0011790 A1*  1/2024 Numakami ............ G01S 17/89

* cited by examiner

VEHICLE BODY TRANSPORT SYSTEM

CROSS-REFERENCE TO RELATED APPLICATION

This application claims the priority benefits of Japanese application no. 2022-042440, filed on Mar. 17, 2022. The entirety of the above-mentioned patent application is hereby incorporated by reference herein and made a part of this specification.

BACKGROUND

Technical Field

The disclosure relates to a vehicle body transport system.

Description of Related Art

A vehicle body transport system including an unmanned carrier that carries and transports a vehicle body between a plurality of work stations has been used in a vehicle manufacturing process or the like. As a technique related to such a vehicle body transport system, for example, Patent Literature 1 (Japanese Patent Laid-Open No. 2006-123684) discloses a technique for transferring a vehicle body between an unmanned carrier and a work station.

An unmanned carrier may be operated, for example, in a factory or the like. In such a case, it is conceivable that moving objects such as workers, forklifts or other carts may pass on the traveling route of the unmanned carrier. Therefore, it is desired to prevent the unmanned carrier carrying and transporting the vehicle body from getting too close to the moving objects.

SUMMARY

A vehicle body transport system (100) according to one aspect of the disclosure includes an unmanned carrier (1) that carries and transports a vehicle body (BD) between a plurality of work stations (ST). The vehicle body transport system (100) includes an imaging device (2) including an imaging part (21) that is capable of imaging a traveling route (RT) of the unmanned carrier (1) and surroundings of the traveling route (RT) from above, an analysis part (22) that analyzes an image (GR) captured by the imaging part (21), and a transmission part (23) that transmits a signal to the unmanned carrier (1). In response to a moving object (OB) other than the unmanned carrier (1) that carries the vehicle body (BD) being present in the image (GR) captured by the imaging part (21), the analysis part (22) predicts whether a movement trajectory (TT) that the vehicle body (BD) passes after a predetermined time intersects a movement position (PP) where the moving object (OB) is located after the predetermined time. In response to predicting that the movement trajectory (TT) and the movement position (PP) intersect after the predetermined time, the transmission part (23) transmits an emergency operation signal to the unmanned carrier (1) before the predetermined time elapses.

DESCRIPTION OF THE EMBODIMENTS

Figure 1:
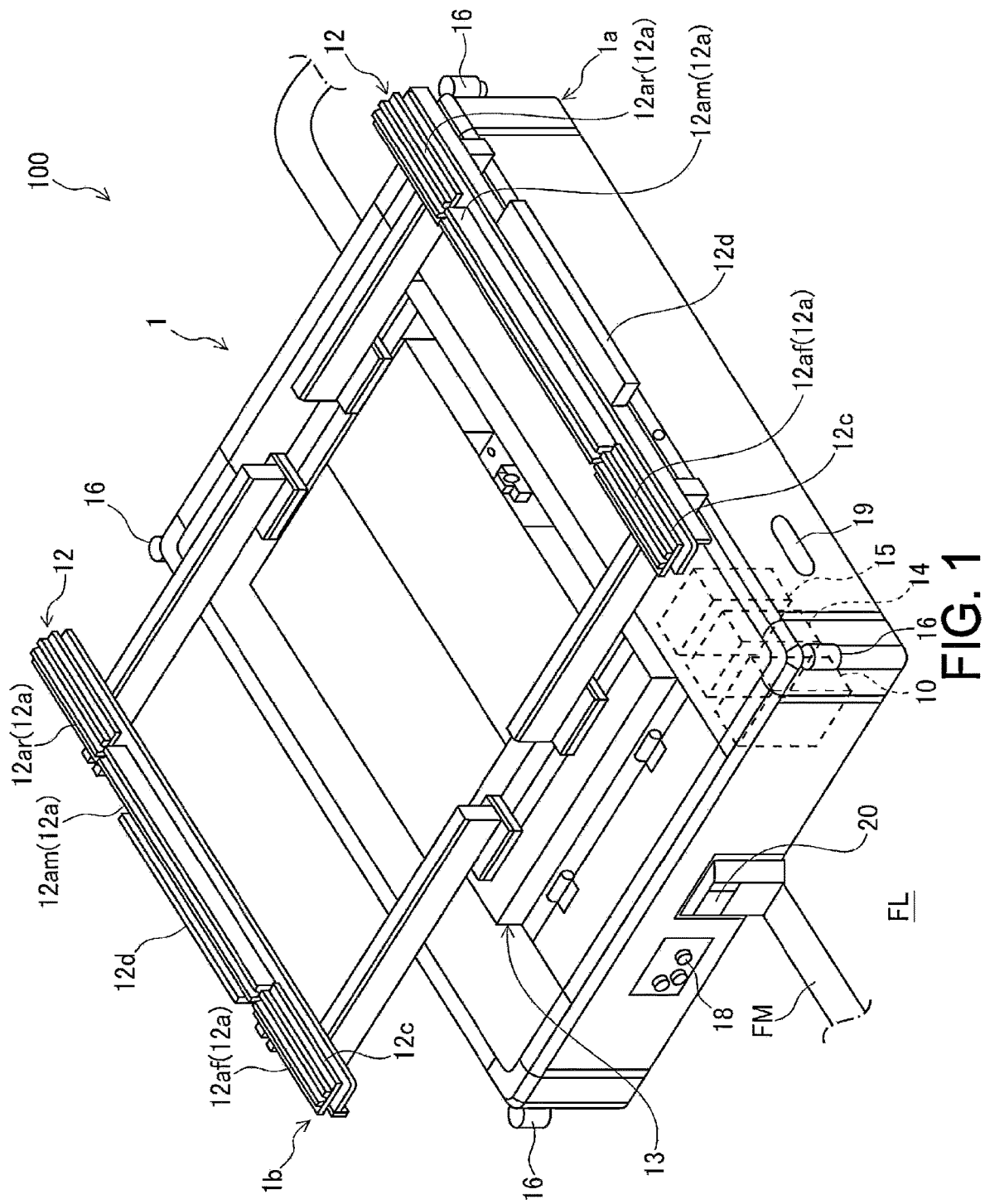
FIG. 1 is a perspective view showing the unmanned carrier of the vehicle body transport system according to this embodiment.

Thus, a vehicle body transport system according to the disclosure makes it possible to prevent the unmanned carrier from getting too close to a moving object.

A vehicle body transport system (100) according to one aspect of the disclosure includes an unmanned carrier (1) that carries and transports a vehicle body (BD) between a plurality of work stations (ST). The vehicle body transport system (100) includes an imaging device (2) including an imaging part (21) that is capable of imaging a traveling route (RT) of the unmanned carrier (1) and surroundings of the traveling route (RT) from above, an analysis part (22) that analyzes an image (GR) captured by the imaging part (21), and a transmission part (23) that transmits a signal to the unmanned carrier (1). In response to a moving object (OB) other than the unmanned carrier (1) that carries the vehicle body (BD) being present in the image (GR) captured by the imaging part (21), the analysis part (22) predicts whether a movement trajectory (TT) that the vehicle body (BD) passes after a predetermined time intersects a movement position (PP) where the moving object (OB) is located after the predetermined time. In response to predicting that the movement trajectory (TT) and the movement position (PP) intersect after the predetermined time, the transmission part (23) transmits an emergency operation signal to the unmanned carrier (1) before the predetermined time elapses.

According to this vehicle body transport system (100), the traveling route (RT) of the unmanned carrier (1) carrying the vehicle body (BD) between a plurality of work stations (ST) and the surroundings of the traveling route (RT) are imaged from above. Then, the captured image (GR) is analyzed to predict whether the movement trajectory (TT) that the vehicle body (BD) passes and the movement position (PP) of the moving object (OB) other than the unmanned carrier (1) intersect after the predetermined time. When it is predicted that the movement trajectory (TT) of the vehicle body (BD) and the movement position (PP) of the moving object (OB) intersect after the predetermined time, the emergency operation signal is transmitted to the unmanned carrier (1) before that. As a result, for example, the unmanned carrier (1) can take action to avoid getting too close to the moving object (OB). Therefore, it is possible to prevent the unmanned carrier (1) from getting too close to the moving object (OB).

In the vehicle body transport system (100) according to one aspect of the disclosure, the imaging part (21) may be installed so as to be capable of imaging a point where the unmanned carrier (1) moves non-linearly. At the point where the unmanned carrier (1) moves non-linearly, it is difficult for the worker or the like around the unmanned carrier (1) to predict the future movement trajectory (TT) of the unmanned carrier (1). Therefore, by capturing the image (GR) of such a point, the action and effect of the vehicle body transport system (100) become even more remarkable.

In the vehicle body transport system (100) according to one aspect of the disclosure, the analysis part (22) may calculate a grounding position (FP) at which the moving object (OB) is in contact with a floor (FL) based on a center-of-gravity position (GP) of the moving object (OB) every unit time that is shorter than the predetermined time, in the image (GR) captured by the imaging part (21), and predict the movement position (PP) of the moving object (OB) after the predetermined time by acquiring the grounding position (FP) in time series. As a result, the deviation between the position of the moving object (OB) in the image (GR) captured from above and the actual position of the moving object (OB) can be corrected, so it is possible to predict the movement position (PP) of the moving object (OB) with higher accuracy, and thus to more reliably prevent the unmanned carrier (1) from getting too close to the moving object (OB).

The reference numerals in parentheses above indicate the reference numerals of the constituent elements in the embodiment described later as an example of the disclosure, and are not intended to limit the disclosure to the aspect of the embodiment.

Thus, the vehicle body transport system according to the disclosure makes it possible to prevent the unmanned carrier from getting too close to the moving object.

Exemplary embodiments will be described hereinafter with reference to the drawings. In addition, the same reference numerals are given to the same or corresponding parts in each drawing, and repeated descriptions are omitted.

[Vehicle Body Transport System]

Figure 2:
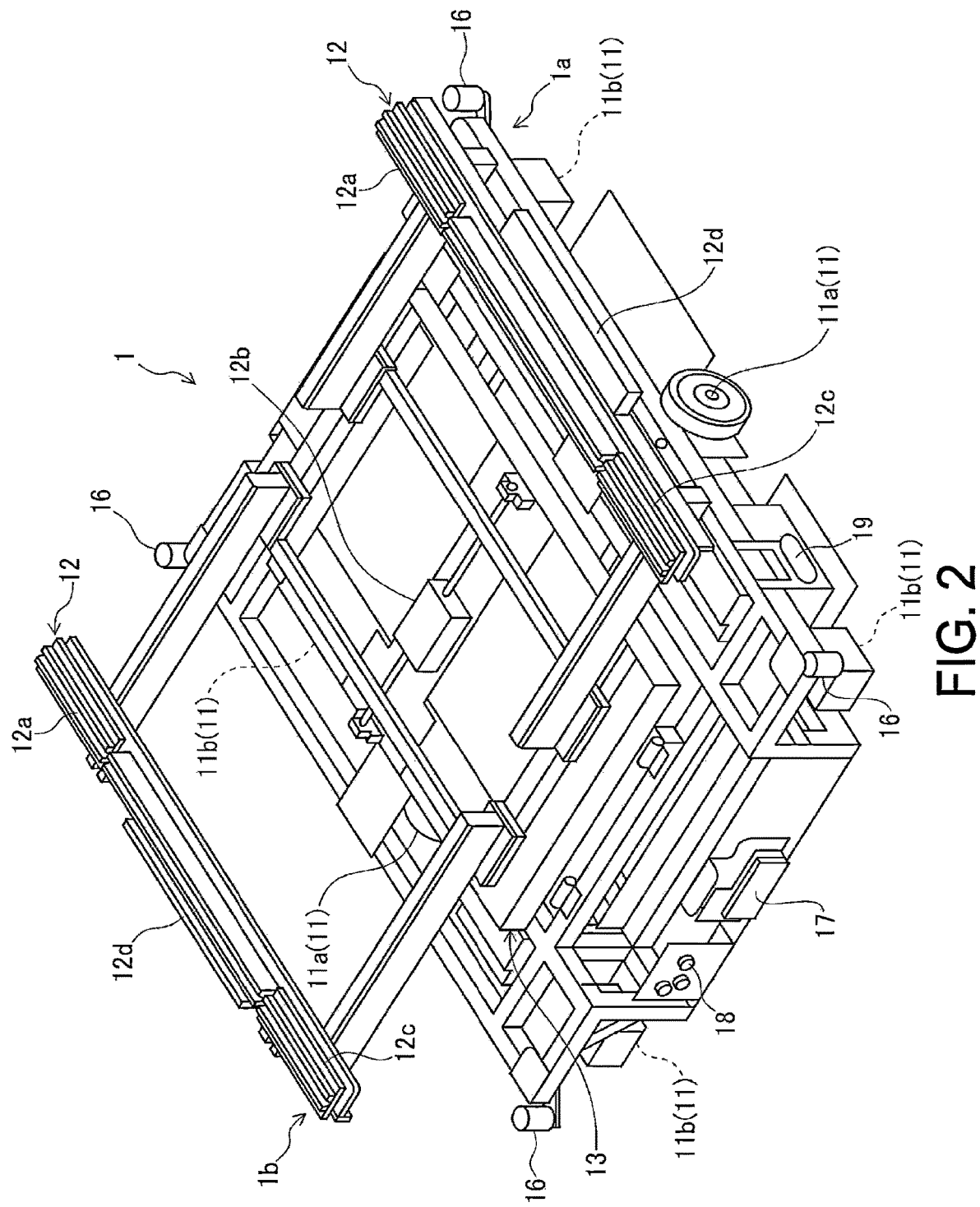
FIG. 2 is a perspective view showing the internal structure of the unmanned carrier.
Figure 3:
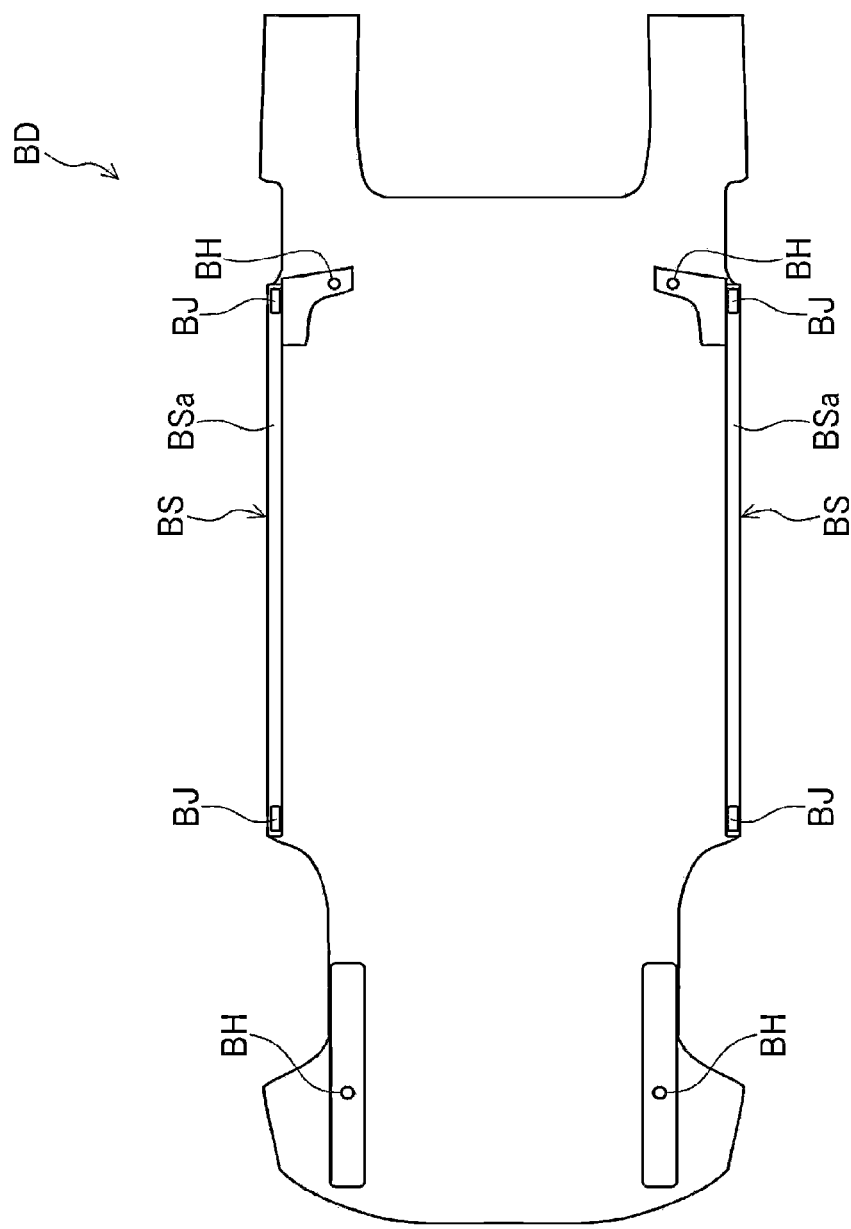
FIG. 3 is a bottom view schematically showing an example of the vehicle body transported by the unmanned carrier.
Figure 4:
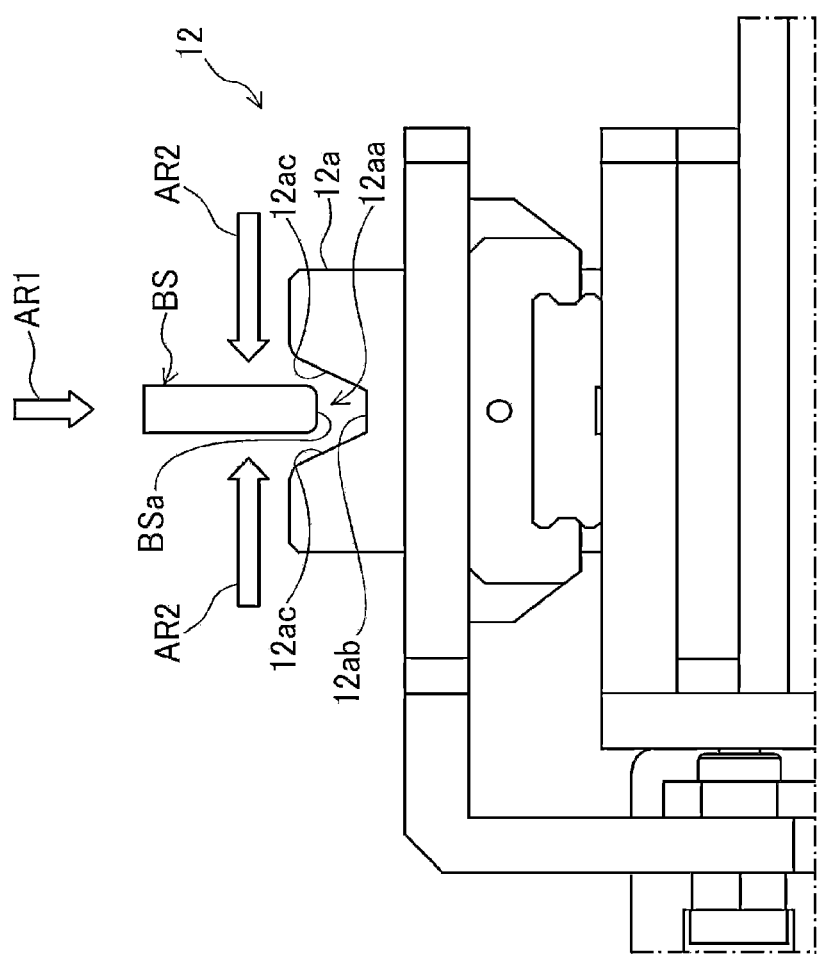
FIG. 4 is a front view showing a state where the lower surface of the side sill is gripped by the gripping portion.

FIG. 1 is a perspective view showing an unmanned carrier 1 of a vehicle body transport system 100 according to this embodiment. FIG. 2 is a perspective view showing the internal structure of the unmanned carrier 1. FIG. 3 is a bottom view schematically showing an example of a vehicle body BD transported by the unmanned carrier 1. FIG. 4 is a cross-sectional view showing that a lower surface BSa of a side sill BS is gripped by a gripping portion 12. As shown in FIG. 1 to FIG. 4, the vehicle body transport system 100 is a transport system including the unmanned carrier 1 that carries and transports the vehicle body BD, and an imaging device 2 (see FIG. 6 and FIG. 7) that images a traveling route RT of the unmanned carrier 1 and the surroundings of the traveling route RT from above.

The vehicle body transport system 100 carries and transports the vehicle body BD between a plurality of work stations ST in, for example, a vehicle manufacturing process and places the vehicle body BD in a properly positioned state at each work station ST. That is, according to the vehicle body transport system 100, the transport of the vehicle body BD and the transfer of the vehicle body BD between the unmanned carrier 1 and the work station ST can be automated. Each vehicle manufacturing process may include processes such as joining, painting, and assembly. The vehicle body transport system 100 is applicable not only to a single vehicle model but also to the manufacturing process for multiple vehicle models.

"Carry" means that the vehicle body BD is mounted on the unmanned carrier 1. The vehicle body BD to be carried by the unmanned carrier 1 may be simply placed on the unmanned carrier 1 or may be fixed with fixtures.

The "traveling route" refers to a route along which the unmanned carrier 1 travels, and may be, for example, a passage from one work station ST to the next work station ST. The "surroundings" of the traveling route RT may mean at least the vicinity of the traveling route RT, and the extent of the range thereof is not particularly limited. It is preferable that at least the range of the movement trajectory TT of the vehicle body BD carried and transported by the unmanned carrier 1, as will be described later, is included in the surroundings of the traveling route RT.

The "vehicle body" is a member that constitutes at least a part of a vehicle in the vehicle manufacturing process, and may be, for example, a frame portion of the vehicle that is made of a monocoque. A pair of side sills BS are provided on the left and right of the vehicle body BD. The side sill BS is a member extending linearly between the wheel arch of the front wheel and the wheel arch of the rear wheel respectively at the left and right ends of the vehicle body BD.

A pair of jack-up points BJ are provided in front and rear of the left and right side sills BS respectively. The "jack-up point" is a position intended to be the point of contact with a jack when the vehicle is jacked up. Here, the jack-up point BJ is configured as a protruding portion protruding downward from the lower surface BSa of the side sill BS.

Further, a plurality of positioning holes BH for inserting positioning pins SP erected on the work station ST are formed in the bottom surface of the vehicle body BD. Specifically, four positioning holes BH are provided at the front and rear ends of the left and right ends of the bottom surface of the vehicle body BD (that is, the four corners of the vehicle body BD).

[Unmanned Carrier]

The unmanned carrier 1 is a cart capable of carrying and transporting an article such as the vehicle body BD between a plurality of work stations ST. The unmanned carrier 1 is capable of automatic operation. For example, the unmanned carrier 1 may be an AGV (Automatic Guided Vehicle). That is, the unmanned carrier 1 is configured to be movable along a magnetic tape FM laid on the floor FL of a factory or the like where the unmanned carrier 1 is operated while detecting the magnetic tape FM by a magnetic sensor 17. Nevertheless, the unmanned carrier 1 is not necessarily limited to a cart that moves along the magnetic tape FM, and may be, for example, a cart that moves while referring to a three-dimensional map generated by SLAM (Simultaneous Localization and Mapping).

The unmanned carrier 1 includes a main body portion 1a having a flat rectangular parallelepiped shape, and an article holding portion 1b provided on the upper surface side of the main body portion 1a to hold an article. Here, the article held by the article holding portion 1b is the vehicle body BD.

The main body portion 1a of the unmanned carrier 1 includes a control part 10, a drive part 11, and a communication part 14. Further, the main body portion 1a may include a battery 15, guide rollers 16, the magnetic sensor 17, a start switch 18, a winker 19, and an obstacle sensor 20.

The article holding portion 1b of the unmanned carrier 1 includes a gripping portion 12 and a lifting portion 13.

The control part 10 is a controller that controls the operation of each part of the unmanned carrier 1 including the drive part 11, the gripping portion 12, the lifting portion 13, and the communication part 14. The control part 10 may further control the battery 15 and the winker 19.

The drive part 11 is a part that drives the unmanned carrier 1. The drive part 11 has a pair of driving wheels 11a provided at the front-rear central portion at both left and right ends of the main body portion 1a. The power source for the pair of driving wheels 11a may be the battery 15, for example. In addition, the drive part 11 has four driven wheels 11b respectively provided at the front and rear ends of the left and right ends of the main body portion 1a (that is, the four corners of the main body portion 1a).

The gripping portion 12 respectively grips the lower surfaces BSa of the pair of side sills BS provided on the left and right of the vehicle body BD. In other words, a pair (two) of gripping portions 12 are provided to respectively correspond to the pair of side sills BS. The gripping portion 12 has a gripping rail 12a, a gripping portion left-right width adjustment mechanism 12b, a gripping portion front-rear length adjustment mechanism 12c, and a touch sensor 12d.

The gripping rail 12a is an elongated member extending in the vehicle front-rear direction. A V-shaped concave portion 12aa directed from the upper surface toward the lower surface side is formed in the gripping rail 12a. The concave portion 12aa has a horizontal bottom surface 12ab and is formed from the front end to the rear end of the gripping portion 12. The concave portion 12aa is a portion that grips the lower surface BSa of the side sill BS of the vehicle body BD when the unmanned carrier 1 transports the vehicle body BD. "Grip" means to support or fix an object, and is not necessarily limited to sandwiching from both sides. In a case where the side sill BS of the vehicle body BD is to be placed on the concave portion 12aa of the gripping rail 12a from above (arrow AR1 in FIG. 4), when the side sill BS is at a position slightly shifted in the left-right direction, the side sill BS is guided toward the central side of the concave portion 12aa by an inclined surface 12ac formed by the concave portion 12aa (arrow AR2 in FIG. 4).

The gripping rail 12a has a front-rear length equal to a front-rear width between the pair of jack-up points BJ on each side sill BS of the vehicle body BD to be transported. "Equal" includes substantially equal. That is, the front-rear width of the gripping rail 12a may be completely the same as the front-rear width between the pair of jack-up points BJ, or may have a slight difference. The front-rear width of the gripping rail 12a may be slightly shorter than the front-rear width between the pair of jack-up points BJ, which relaxes the positioning accuracy required when gripping the lower surface BSa of the side sill BS with the gripping rail 12a. On the other hand, if the front-rear width of the gripping rail 12a is too much shorter than the front-rear width between the pair of jack-up points BJ, as will be described later, it becomes difficult to secure the positioning accuracy necessary for inserting the positioning pins SP of the work station ST into the positioning holes BH of the vehicle body BD.

The gripping portion left-right width adjustment mechanism 12b is a mechanism for adjusting the left-right width between the pair of gripping portions 12 (more specifically, the pair of gripping rails 12a). The gripping portion left-right width adjustment mechanism 12b causes each of the pair of gripping rails 12a to move in parallel in the left-right direction. For example, the gripping portion left-right width adjustment mechanism 12b may be an actuator connected to each of the pair of gripping rails 12a. In this case, the gripping portion left-right width adjustment mechanism 12b may operate with electric power supplied from the battery 15.

The gripping portion front-rear length adjustment mechanism 12c is a mechanism for adjusting the front-rear length of each gripping portion 12 (more specifically, each gripping rail 12a). Here, each gripping rail 12a is divided into three members (a front member 12af, a central member 12am, and a rear member 12ar) in the front-rear direction, and the gripping portion front-rear length adjustment mechanism 12c advances and retracts the front member 12af and the rear member 12ar in the front-rear direction. For example, the gripping portion front-rear length adjustment mechanism 12c may be an actuator connected to each gripping rail 12a. In this case, the gripping portion front-rear length adjustment mechanism 12c may operate with electric power supplied from the battery 15. Alternatively, the gripping portion front-rear length adjustment mechanism 12c may be a manually operated mechanism.

The touch sensor 12d is a switch for emergency stop provided on the outer surface of each gripping rail 12a. The touch sensor 12d stops the operation of the unmanned carrier 1 when pressed.

The lifting portion 13 is a portion for lifting the gripping portion 12. The lifting portion 13 lifts the vehicle body BD in a state where the lower surface BSa of the side sill BS is gripped by the gripping portion 12 together with the gripping portion 12. "Lift" means to raise or lower. For example, the lifting portion 13 may be an actuator that is interposed between the main body portion 1a and the gripping portion 12 and that can expand and contract in the up-down direction. In this case, the lifting portion 13 may operate with electric power supplied from the battery 15.

The communication part 14 is a part that communicates with an external device. The communication part 14 may communicate by any communication method. The communication part 14 may receive a control signal for the unmanned carrier 1 from, for example, the imaging device 2 installed on the side of the ceiling CL of the factory or the like where the unmanned carrier 1 is operated. Alternatively, the communication part 14 may receive a control signal for the unmanned carrier 1 from a separately provided device.

The battery 15 supplies electric power for operating each part of the unmanned carrier 1. A plurality of batteries 15 may be mounted. The battery 15 may, for example, be removed from the unmanned carrier 1 and charged, or may be charged while being mounted on the unmanned carrier 1.

The guide roller 16 is a portion that, when the unmanned carrier 1 interferes with an obstacle such as a wall, guides the unmanned carrier 1 to smoothly turn along the wall. The guide roller 16 is a cylindrical rotary body that is provided rotatably around a central axis extending in the up-down direction. The guide rollers 16 are respectively provided at the front and rear ends of the left and right ends of the main body portion 1a (that is, the four corners of the main body portion 1a). In other words, four guide rollers 16 are provided here. As will be described later, when the unmanned carrier 1 arrives at the work station ST, the guide rollers 16 guide the unmanned carrier 1 to smoothly turn along the guide rail SG while rolling along the guide rail SG of the work station ST.

The magnetic sensor 17 and the obstacle sensor 20 are sensors that detect the external situation of the unmanned carrier 1. The magnetic sensor 17 may be, for example, a magnetic detection sensor that detects the magnetic tape FM laid on the floor FL of the factory or the like where the unmanned carrier 1 is operated. Further, the obstacle sensor 20 is composed of a distance sensor, for example, and may detect whether there is an obstacle in the traveling direction of the unmanned carrier 1. When the unmanned carrier 1 is a cart that moves while referring to the three-dimensional map generated by SLAM, for example, a camera (not shown) may be provided as an external sensor for imaging the surroundings of the unmanned carrier 1.

The start switch 18 is an input switch for starting or stopping the unmanned carrier 1. The start switch 18 may have any shape. In addition, the start switch 18 may be remotely controlled by wireless communication.

The winker 19 is a direction indicator that indicates the direction in which the unmanned carrier 1 is going to travel. Although the specific configuration of the winker 19 is not limited, for example, the winker 19 may be configured to flash light in the direction in which the unmanned carrier 1 turns.

[Work Station]

Figure 5:
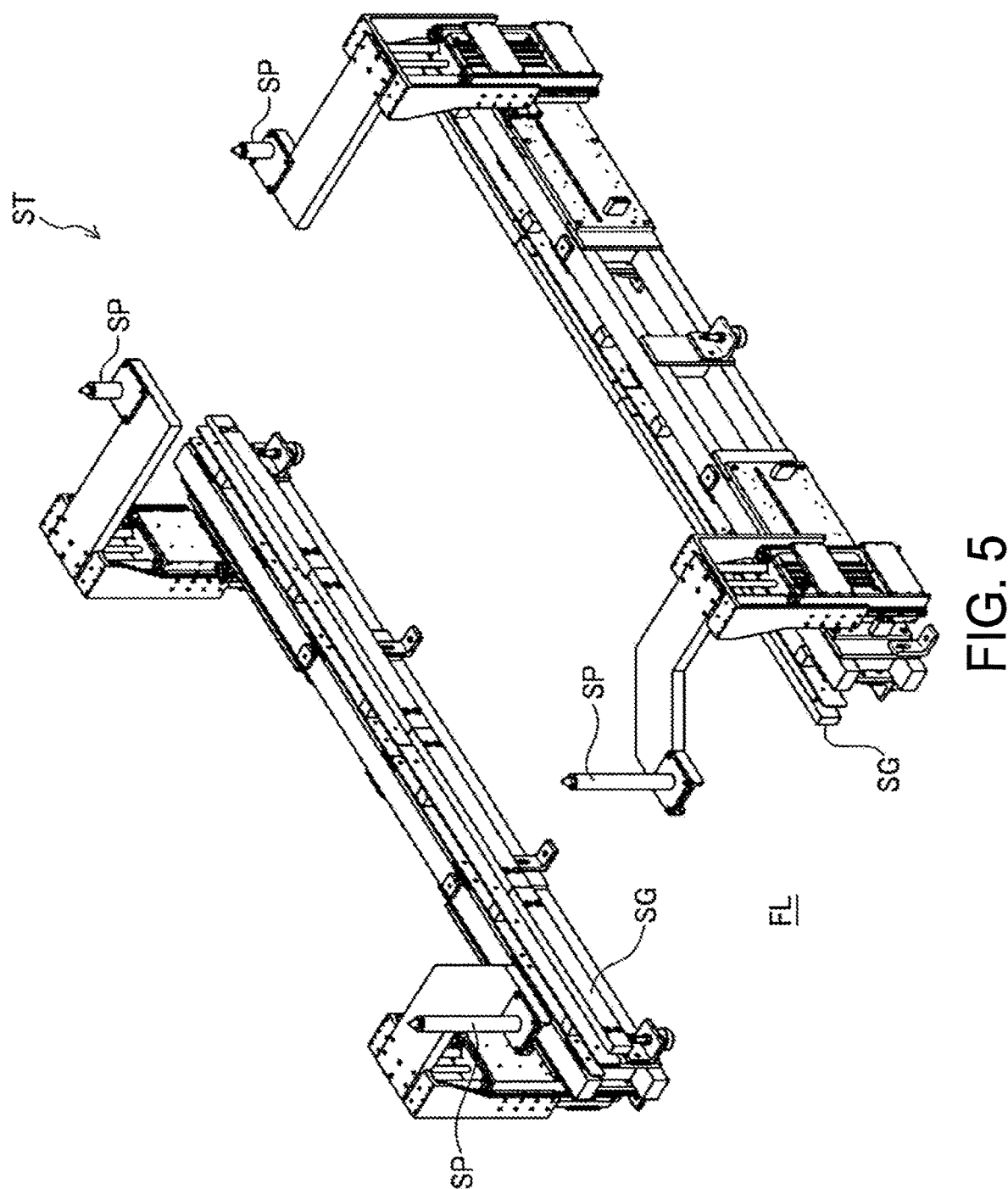
FIG. 5 is a perspective view showing an example of the work station.

A configuration of the work station ST will be described. The work station ST is, for example, a place for performing work on the vehicle body BD. At the work station ST, the vehicle body BD is unloaded from the unmanned carrier 1 and placed on the work station ST. FIG. 5 is a perspective view showing an example of the work station ST. As shown in FIG. 5, the work station ST has a pair of guide rails SG and a plurality of positioning pins SP.

The pair of guide rails SG are provided facing each other so as to be substantially parallel to each other. The distance between the pair of guide rails SG is substantially equal to the left-right width of the main body portion 1a of the unmanned carrier 1. In more detail, the distance between the pair of guide rails SG is substantially equal to the width between the left end of the guide roller 16 provided on the left side of the main body portion 1a and the right end of the guide roller 16 provided on the right side of the main body portion 1a. Further, the height of each guide rail SG from the floor FL matches the height of the guide roller 16 provided on the main body portion 1a from the floor FL. Thus, the unmanned carrier 1 arriving at the work station ST is guided so that the unmanned carrier 1 smoothly turns along the guide rails SG while the guide rollers 16 roll along the guide rails SG. The AGV entry portion of the guide rails SG has a V shape (tapered shape) to allow the entry deviation of the unmanned carrier 1.

Each positioning pin SP is a member having an elongated and substantially cylindrical shape, and is erected on the work station ST. Each positioning pin SP is inserted through the positioning hole BH formed in the vehicle body BD. Therefore, each positioning pin SP is provided at a position corresponding to the positioning hole BH of the vehicle body BD. The work station ST is provided with four positioning pins SP corresponding to the four positioning holes BH formed in the vehicle body BD. By inserting the positioning pin SP into the positioning hole BH, the vehicle body BD is accurately positioned with respect to the work station ST. The work station ST possesses vehicle information regarding the vehicle (vehicle body BD) that is transported, and can be easily applied to multiple vehicle models by varying the positioning pin SP or welding jig according to the shape of the vehicle body BD that is transported.

[Imaging Device]

Figure 6:
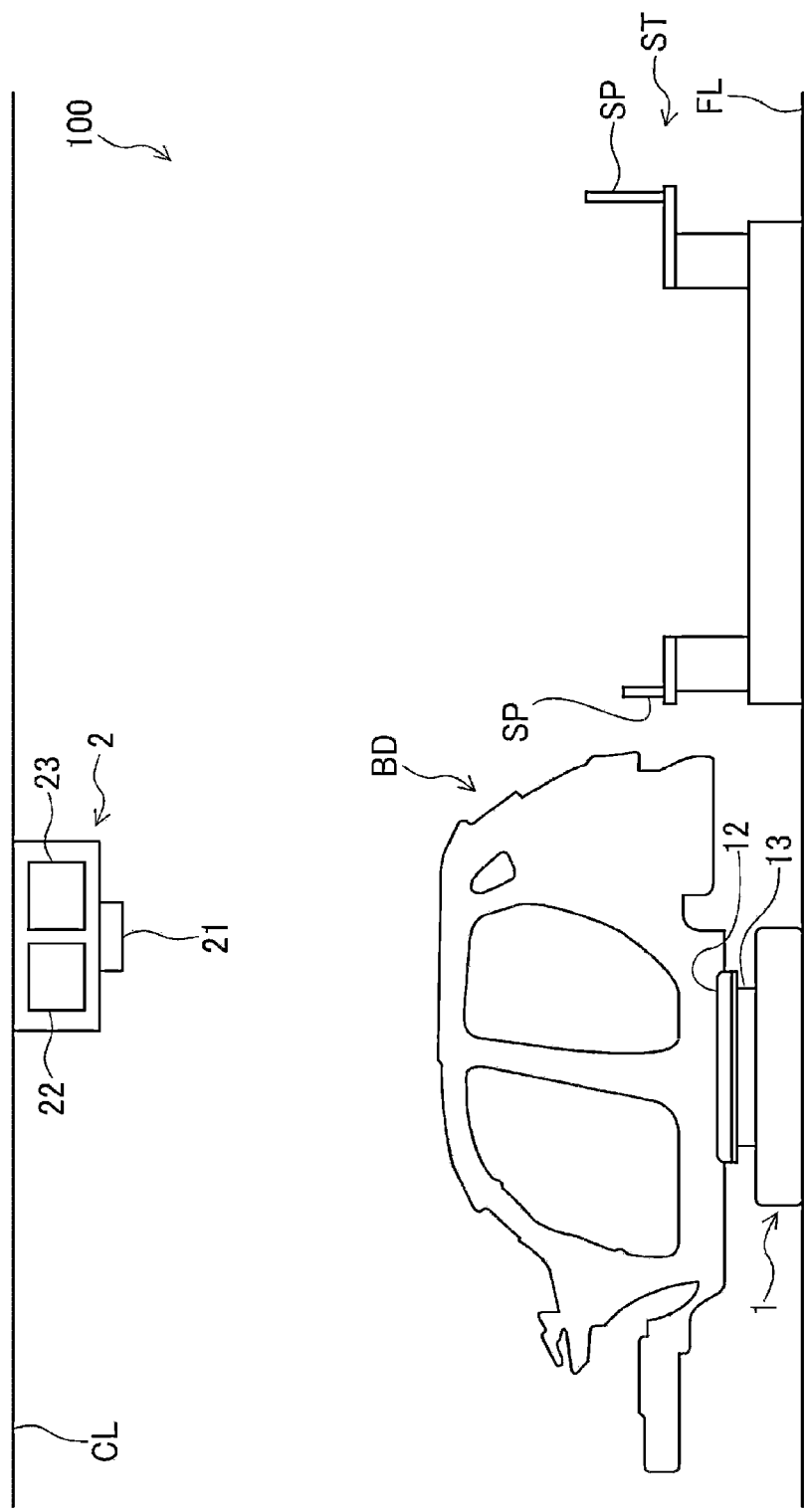
FIG. 6 is a side view showing a state where the unmanned carrier carrying the vehicle body is imaged by the imaging device from above.

FIG. 6 is a side view showing a state where the unmanned carrier 1 carrying the vehicle body BD is imaged by the imaging device 2 from above. As shown in FIG. 6, the imaging device 2 is a device that images the side of the floor FL from the side of the ceiling CL of the factory or the like where the unmanned carrier 1 is operated, and analyzes the captured image GR. The imaging device 2 has an imaging part 21, an analysis part 22, and a transmission part 23.

The imaging part 21 is a device capable of imaging the traveling route RT of the unmanned carrier 1 and the surroundings of the traveling route RT from above. The imaging part 21 may be, for example, a camera. The imaging part 21 is installed near the ceiling CL of the factory or the like where the unmanned carrier 1 is operated. The imaging part 21 may be installed so as to be capable of imaging a point where the unmanned carrier 1 moves non-linearly. Here, the imaging part 21 is installed so as to be capable of imaging a turning point of the traveling route RT of the unmanned carrier 1. By configuring in this way, even if the moving object OB approaches from outside the detection range of various sensors such as an external sensor mounted on the unmanned carrier 1 (that is, from a blind spot), the imaging part 21 can compensate for the blind spot. The imaging part 21 transmits the captured image GR to the analysis part 22.

The analysis part 22 analyzes the image GR captured by the imaging part 21. The analysis part 22 analyzes the image GR and predicts whether the moving object OB other than the unmanned carrier 1 gets too close to the vehicle body BD carried by the unmanned carrier 1. Specifically, the analysis part 22 predicts whether the movement trajectory TT that the vehicle body BD passes after a predetermined time intersects the movement position PP where the moving object OB is located after the predetermined time (hereinafter, the prediction is also referred to as "intersection prediction"). The analysis part 22 may be configured integrally with the imaging part 21 or may be configured separately from the imaging part 21.

The transmission part 23 transmits a signal to the unmanned carrier 1. Specifically, when it is predicted that the movement trajectory TT and the movement position PP intersect after the predetermined time, the transmission part 23 transmits an emergency operation signal to the unmanned carrier 1 before the predetermined time elapses. The "emergency operation signal" refers to a control signal that causes the unmanned carrier 1 to perform an emergency operation. The "emergency operation" may be, for example, deceleration, stop, issuing of an alarm, avoidance, or the like.

[Intersection Prediction]

The intersection prediction performed by the analysis part 22 will be described. The "intersection prediction" is prediction of whether the movement trajectory TT that the vehicle body BD passes after the predetermined time intersects the movement position PP where the moving object OB is located after the predetermined time. The "intersection" means that at least a part of the movement trajectory TT and at least a part of the movement position PP overlap at a certain point of time. That is, the intersection means that the movement trajectory TT and the movement position PP interfere with each other.

Figure 7:
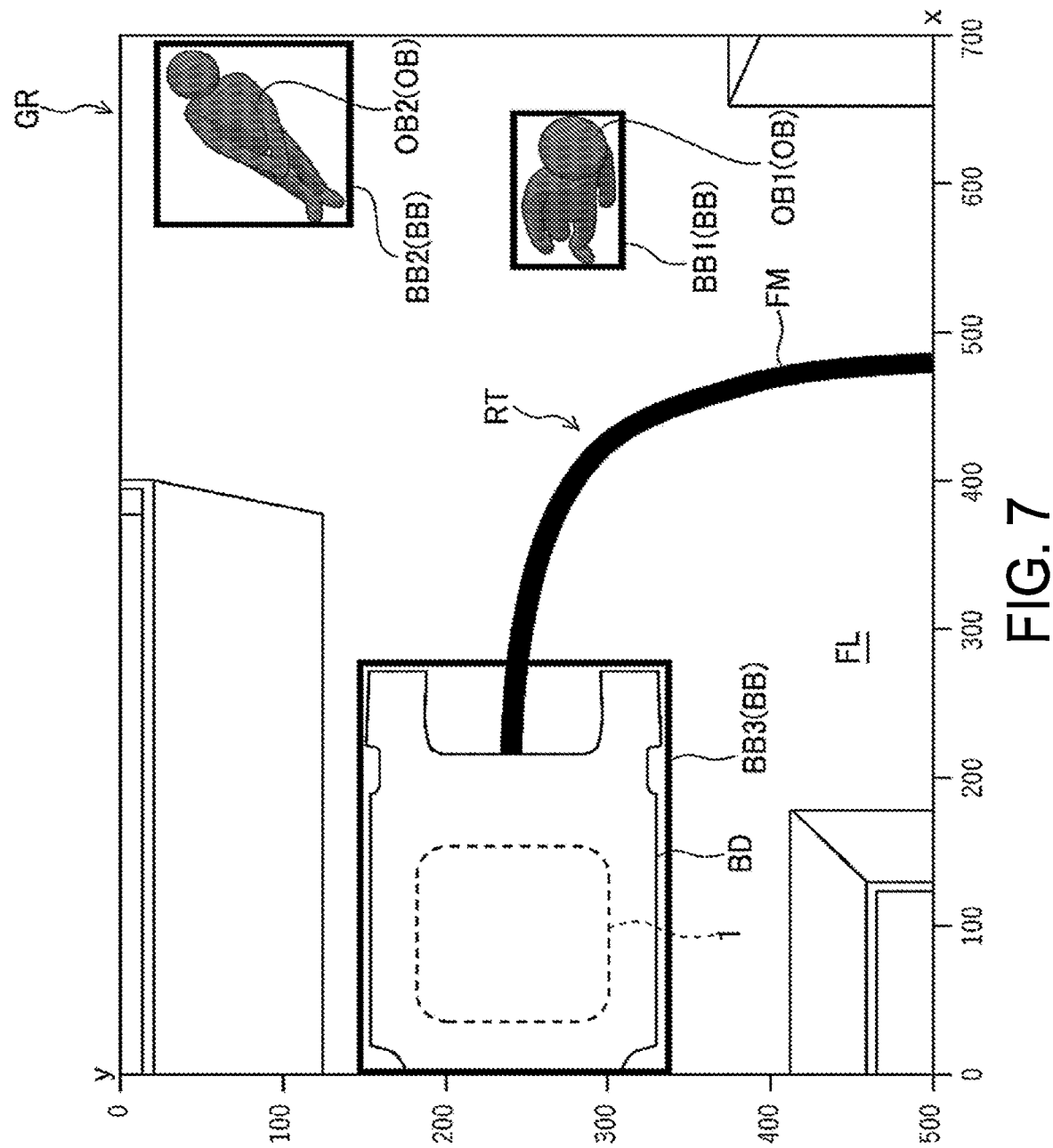
FIG. 7 is a diagram showing an example of the image obtained by imaging the traveling route of the unmanned carrier and the surroundings of the traveling route from above.

FIG. 7 is a diagram showing an example of the image GR obtained by imaging the traveling route RT of the unmanned carrier 1 and the surroundings of the traveling route RT from above. As shown in FIG. 7, the image GR captured by the imaging part 21 has a coordinate (x-coordinate) in the horizontal direction of the image and a coordinate (y-coordinate) in the vertical direction of the image. The image GR includes the magnetic tape FM laid non-linearly (specifically, laid to curve) on the floor FL, the vehicle body BD carried by the unmanned carrier 1 traveling along the magnetic tape FM, and two workers (moving object OB1 and moving object OB2) who are moving objects OB. In FIG. 7, the unmanned carrier 1 carrying the vehicle body BD is traveling substantially rightward in the image GR along the magnetic tape FM at a known speed, the moving object OB1 is walking substantially leftward in the image GR, and the moving object OB2 temporarily stops.

The image GR also includes a bounding box BB indicating the presence of the vehicle body BD and the moving object OB. The bounding box BB is a rectangular frame surrounding the image area of the object recognized by the analysis part 22 in the image GR. Here, a bounding box BB1, a bounding box BB2, and a bounding box BB3 are shown as the bounding boxes BB corresponding to the moving object OB1, the moving object OB2, and the vehicle body BD, respectively. Each bounding box BB is labeled with the type of object by the analysis part 22. The analysis part 22 can attach the bounding box BB to the image GR based on a known algorithm. As an example, the analysis part 22 may attach the bounding box BB in the image GR by image recognition using machine learning. The object recognized by the analysis part 22 is subjected to tracking processing (that is, linking of objects between frames).

Figure 8:
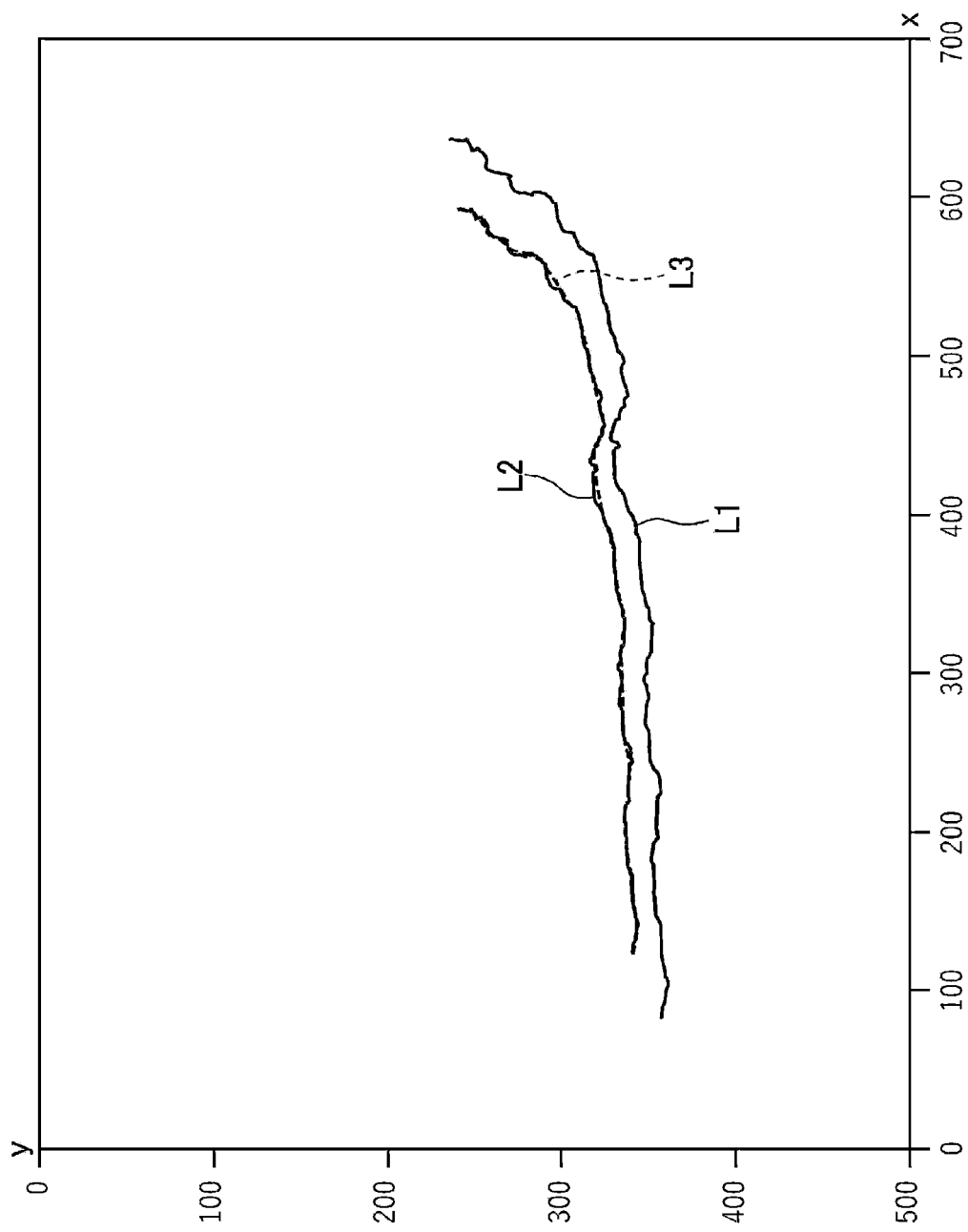
FIG. 8 is a diagram showing the grounding position of the moving object, calculated based on the center-of-gravity position of the moving object, in the captured image.

FIG. 8 is a diagram showing a grounding position FP of the moving object OB, calculated based on a center-of-gravity position GP of the moving object OB, in the captured image GR. FIG. 8 has a coordinate system corresponding to the x-coordinate and y-coordinate of the image GR shown in FIG. 7, and shows the position of the moving object OB1 in the coordinate system.

Here, the solid line L1 represents transition of the center-of-gravity position GP of the bounding box BB1 in the image GR. The "center-of-gravity position" refers to the center position of the bounding box BB. The solid line L2 represents the grounding position FP of the moving object OB, calculated based on the center-of-gravity position GP of the bounding box BB1, in the image GR. The "grounding position" refers to a position where the moving object OB is in contact with the floor FL. Since the moving object OB1 is the worker here, the grounding position FP of the moving object OB1 is the worker's feet. The grounding position FP is calculated every time unit shorter than the predetermined time, which will be described later. The dashed line L3 represents a position where noise is removed (smoothed) by applying a Kalman filter to the center-of-gravity position GP of the bounding box BB1 shown as the solid line L2. Noise may be removed using a method other than the Kalman filter.

Figure 9:
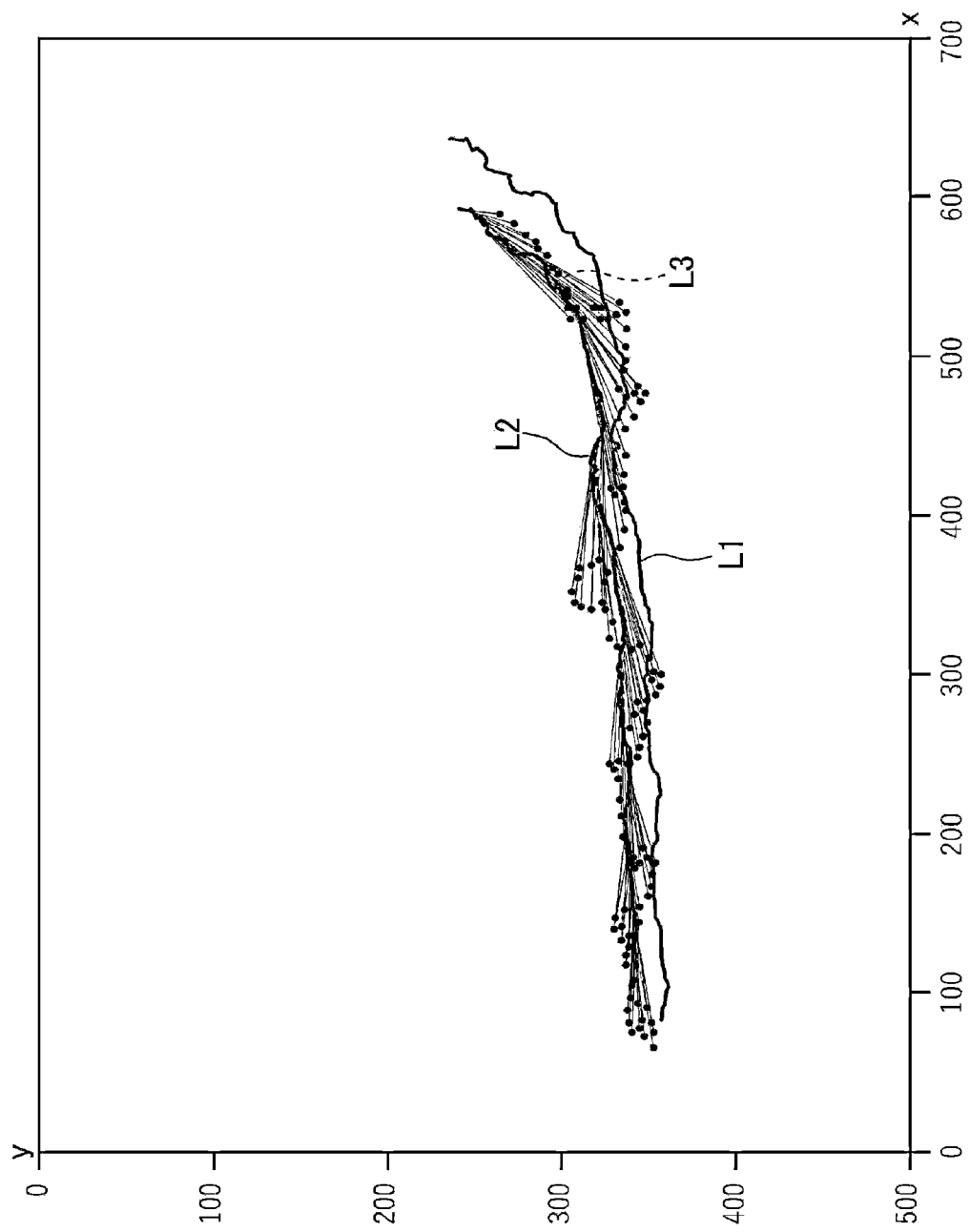
FIG. 9 is a diagram showing the movement position after the predetermined time, estimated based on the center-of-gravity position of the moving object, in the captured image.

FIG. 9 is a diagram showing the movement position PP after the predetermined time, estimated based on the center-of-gravity position GP of the moving object OB, in the captured image GR. FIG. 9 is a diagram plotting a position, predicted to be the position after one second, from the position where noise is removed by applying the Kalman filter to the center-of-gravity position GP of the bounding box BB1 in FIG. 8. Here, the position after one second is set as a position calculated on the assumption of movement at a constant speed in both the x-axis direction and the y-axis direction. Since the grounding position FP is acquired in time series in this way, it is possible to predict the movement position PP of the moving object OB after the predetermined time. As an example, the following calculation formulas can be used to calculate the position after T seconds (for example, after one second).

$$\dot{x}_n = (x_n - x_{n-1})/\Delta t \, [\text{mm/s}] \quad \text{[Formula 1]}$$

$$\dot{y}_n = (y_n - y_{n-1})/\Delta t \, [\text{mm/s}] \quad \text{[Formula 2]}$$

$$x_{n+1} = x_n + \dot{x}_n \times T \, [\text{mm}] \quad \text{[Formula 3]}$$

$$y_{n+1} = y_n + \dot{y}_n \times T \, [\text{mm}] \quad \text{[Formula 4]}$$

$$T = 1 \, [s] \quad \text{[Formula 5]}$$

Figure 10:
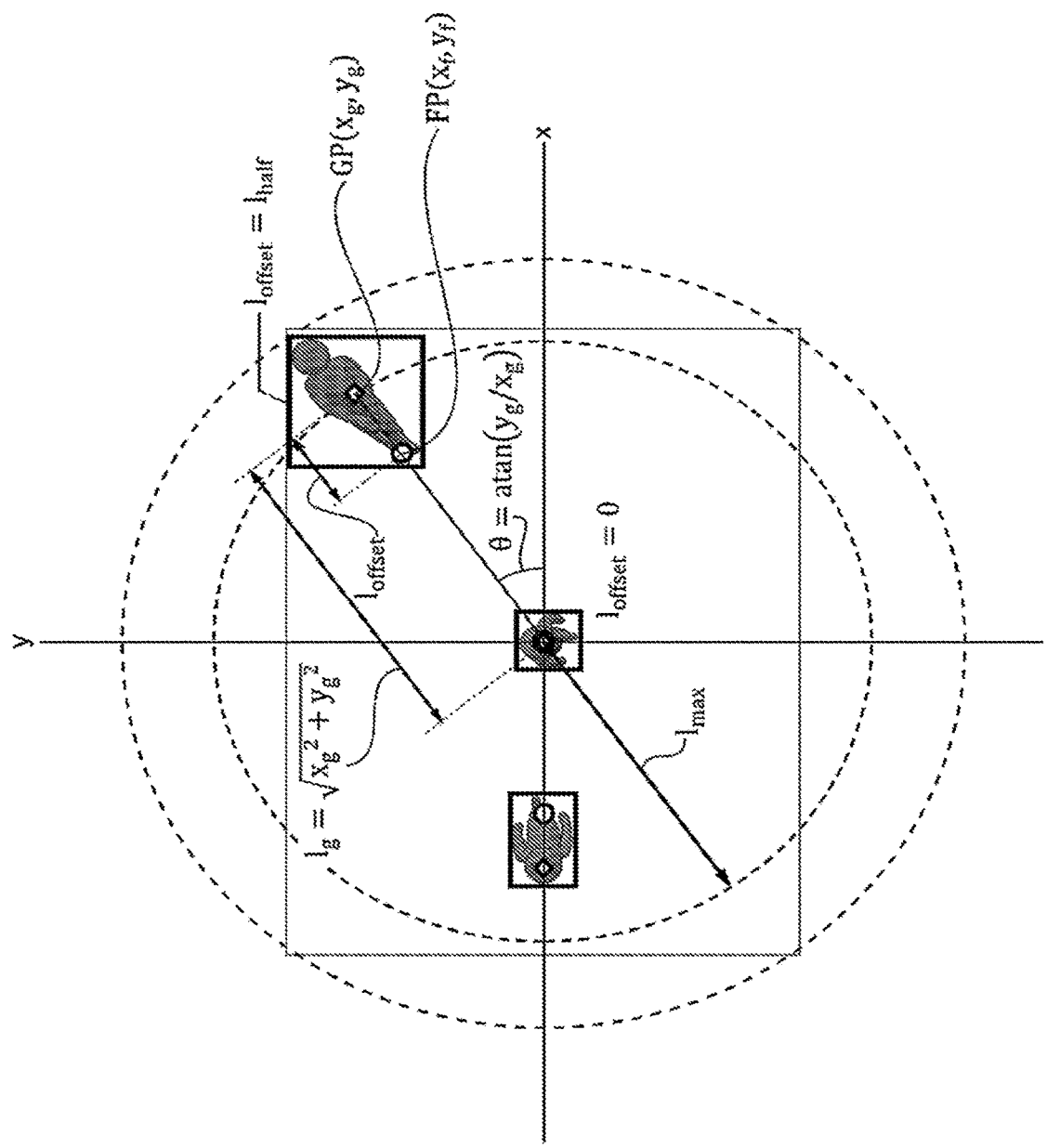
FIG. 10 is a diagram for illustrating the method of calculating the grounding position of the moving object based on the center-of-gravity position of the moving object.

A method of predicting the grounding position FP based on the center-of-gravity position GP will be described. FIG. 10 is a diagram for illustrating the method of calculating the grounding position FP of the moving object OB based on the center-of-gravity position GP of the moving object OB. In FIG. 10, the angle of view of the image GR is indicated by a rectangle. Then, how the moving object OB appears when the moving object OB is present at each position in the image GR is illustrated. When the coordinates of the center-of-gravity position GP are set to $(x_g, y_g)$, the coordinates of the grounding position FP are set to $(x_f, y_f)$, and the distance by which the grounding position FP is offset from the center-of-gravity position GP toward the central side of the image GR is set to $l_{offset}$, the coordinates of the grounding position FP are represented by the following formulas.

$$x_f = x_g - l_{offset} \times \cos\theta \quad \text{[Formula 6]}$$

$$y_f = y_g - l_{offset} \times \sin\theta \quad \text{[Formula 7]}$$

Here, the variables are represented by the following formulas. The numerical value of 1700 mm used to calculate $l_{half}$ means the height of a typical worker, and $l_{max}$ is $l_g$ at the limit where the worker's whole body can be seen in the image GR. At this time, $l_{offset}$ is equal to $l_{half}$.

$$l_{offset} = l_{half} \times l_g / l_{max} \quad \text{[Formula 8]}$$

$$l_{half} = 1700/2 \, [\text{mm}] \quad \text{[Formula 9]}$$

$$l_g = \sqrt{x_g^2 + y_g^2} \quad \text{[Formula 10]}$$

$$\theta = a\tan(y_g/x_g) \quad \text{[Formula 11]}$$

When the moving object OB is positioned at the center of the image GR, $l_{offset}$ is 0, and the center-of-gravity position GP coincides with the grounding position FP.

Figure 11:
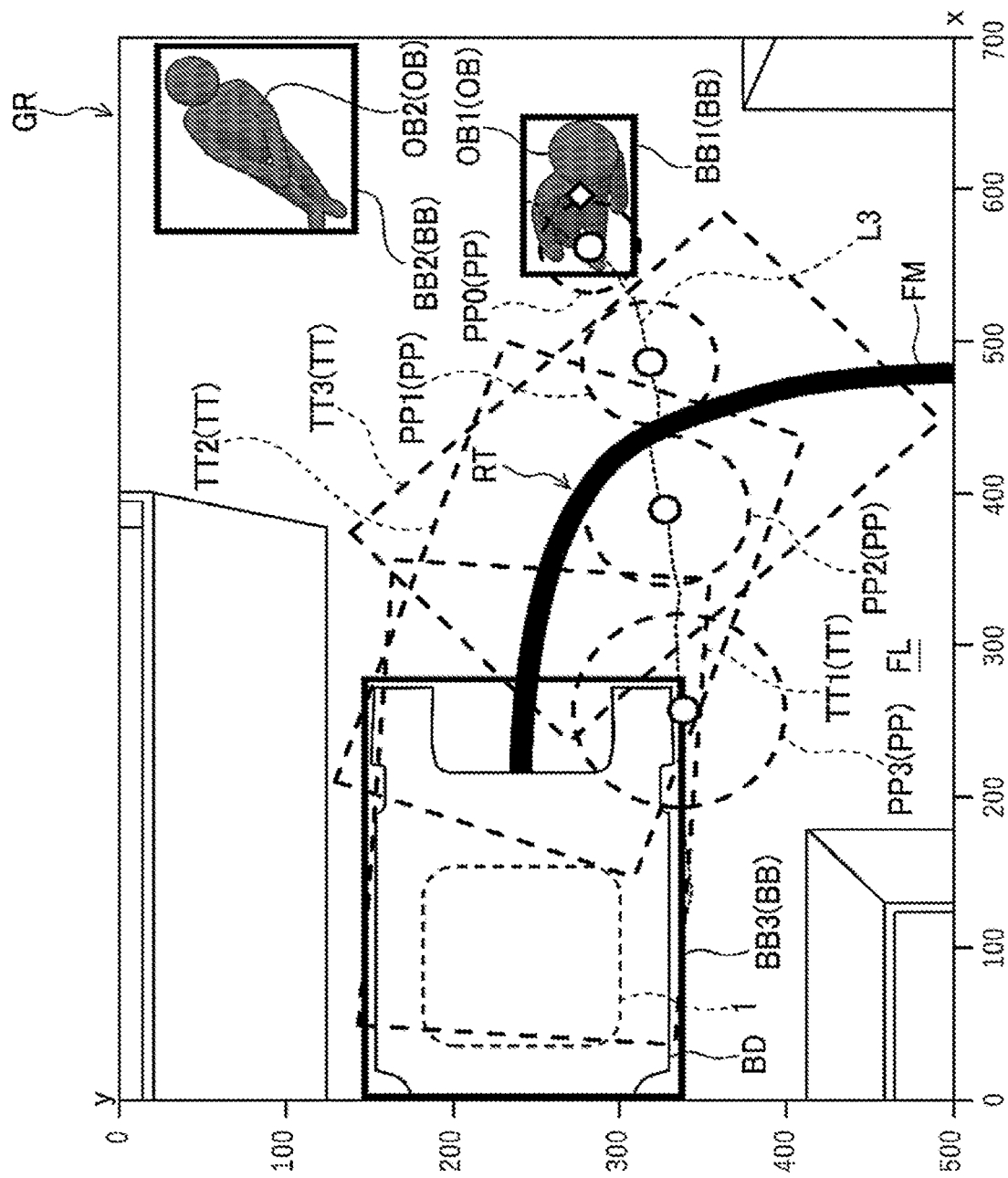
FIG. 11 is a diagram for illustrating a situation in which the movement trajectory of the vehicle body and the movement position of the moving object intersect after the predetermined time.

FIG. 11 is a diagram for illustrating a situation in which the movement trajectory TT of the vehicle body BD and the movement position PP of the moving object OB intersect after the predetermined time. FIG. 11 is a diagram that causes the dashed line L3 in FIG. 8 to be superimposed on the image GR in FIG. 7, and shows the movement trajectory TT that the vehicle body BD passes after the predetermined time and the movement position PP where the moving object OB (here, only the moving object OB1 since the moving object OB2 stops) is located after the predetermined time.

The circle indicated by a dashed line is the movement position PP of the moving object OB1 after the predetermined time. A movement position PP0 when the predetermined time is assumed to be 0 seconds, a movement position PP1 when the predetermined time is N seconds, a movement position PP2 when the predetermined time is 2N seconds, and a movement position PP3 when the predetermined time is 3N seconds are shown as the movement position PP. N is an arbitrary constant time longer than the time unit at which the grounding position FP is calculated. The circle indicating the movement position PP has a radius corresponding to the probability distribution of the movement position PP. Here, the longer the predetermined time, the lower the prediction accuracy, so the radius of the circle indicating the movement position PP is increased.

The rectangle indicated by a dashed line is the movement trajectory TT that the vehicle body BD passes after the predetermined time. A movement trajectory TT1 when the predetermined time is N seconds, a movement trajectory TT2 when the predetermined time is 2N seconds, and a movement trajectory TT3 when the predetermined time is 3N seconds are shown as the movement trajectory TT.

According to FIG. 11, the movement position PP1 of the moving object OB1 after N seconds and the movement trajectory TT1 of the vehicle body BD after N seconds do not intersect each other. In contrast, the movement position PP2 of the moving object OB1 after 2N seconds and the movement trajectory TT2 of the vehicle body BD after 2N seconds intersect each other. Similarly, the movement position PP3 of the moving object OB1 after 3N seconds and the movement trajectory TT3 of the vehicle body BD after 3N seconds intersect each other.

The analysis part 22 calculates the grounding position FP at which the moving object OB is in contact with the floor FL based on the center-of-gravity position GP of the moving object OB in the image GR at each unit time shorter than the predetermined time. Then, the analysis part 22 acquires the grounding position FP in time series to predict the movement position PP after the predetermined time. Since the traveling route RT and speed of the unmanned carrier 1 carrying the vehicle body BD are known, when there is a moving object OB other than the unmanned carrier 1 carrying the vehicle body BD in the image GR captured by the imaging part 21, the analysis part 22 can predict whether the movement trajectory TT that the vehicle body BD passes after the predetermined time and the movement position PP where the moving object OB is located after the predetermined time intersect.

The transmission part 23 transmits an emergency operation signal to the unmanned carrier 1 when it is predicted that the movement position PP and the movement trajectory TT intersect. The transmission part 23 may change the instruction content of the emergency operation signal to be transmitted to the unmanned carrier 1 according to the time until the movement position PP and the movement trajectory TT intersect. For example, the transmission part 23 may transmit the emergency operation signal for causing an emergency stop of the unmanned carrier 1 when the movement position PP and the movement trajectory TT intersect for the first time after N seconds, transmit an emergency operation signal for decelerating the unmanned carrier 1 when the movement position PP and the movement trajectory TT intersect for the first time after 2N seconds, and transmit an emergency operation signal for issuing an alarm when the movement position PP and the movement trajectory TT intersect for the first time after 3N seconds.

[Action and Effect]

As described above, the vehicle body transport system 100 is a vehicle body transport system 100 including the unmanned carrier 1 that carries and transports the vehicle body BD between a plurality of work stations ST. The vehicle body transport system 100 includes the imaging device 2, which includes the imaging part 21 capable of imaging the traveling route RT of the unmanned carrier 1 and the surroundings of the traveling route RT from above, the analysis part 22 analyzing the image GR captured by the imaging part 21, and the transmission part 23 transmitting a signal to the unmanned carrier 1. When a moving object OB other than the unmanned carrier 1 carrying the vehicle body BD is present in the image GR captured by the imaging part 21, the analysis part 22 predicts whether the movement trajectory TT that the vehicle body BD passes after the predetermined time and the movement position PP where the moving object OB is located after the predetermined time intersect. When it is predicted that the movement trajectory TT and the movement position PP intersect after the predetermined time, the transmission part 23 transmits the emergency operation signal to the unmanned carrier 1 before the predetermined time elapses.

According to the vehicle body transport system 100, the traveling route RT of the unmanned carrier 1 that carries and transports the vehicle body BD between a plurality of work stations ST and the surroundings of the traveling route RT are imaged from above. Then, the captured image GR is analyzed to predict whether the movement trajectory TT that the vehicle body BD passes and the movement position PP of the moving object OB other than the unmanned carrier 1 intersect after the predetermined time. When it is predicted that the movement trajectory TT of the vehicle body BD and the movement position PP of the moving object OB intersect after the predetermined time, the emergency operation signal is transmitted to the unmanned carrier 1 before that time. Thus, for example, the unmanned carrier 1 can take action to avoid getting too close to the moving object OB. Therefore, it is possible to prevent the unmanned carrier 1 from getting too close to the moving object OB.

In the vehicle body transport system 100, the imaging part 21 is installed so as to be capable of imaging a point where the unmanned carrier 1 moves non-linearly. At the point where the unmanned carrier 1 moves non-linearly, it is difficult for the worker or the like around the unmanned carrier 1 to predict the future movement trajectory TT of the unmanned carrier 1. Therefore, by capturing the image GR of such a point, the action and effect of the vehicle body transport system 100 become even more remarkable.

In the vehicle body transport system 100, the analysis part 22 calculates the grounding position FP at which the moving object OB is in contact with the floor FL based on the center-of-gravity position GP of the moving object OB every unit time shorter than the predetermined time, in the image GR captured by the imaging part 21; and predicts the movement position PP of the moving object OB after the predetermined time by acquiring the grounding position FP in time series. As a result, the deviation between the position of the moving object OB in the image GR captured from above and the actual position of the moving object OB can be corrected, so it is possible to predict the movement position PP of the moving object OB with higher accuracy, and thus to more reliably prevent the unmanned carrier 1 from getting too close to the moving object OB.

[Modified Form]

The above-described embodiments can be implemented in various forms modified or improved based on the knowledge of those skilled in the art.

For example, the shape, etc. of the unmanned carrier 1 may be different from those shown in the above-described embodiments. Similarly, the shape, etc. of the work station ST may be different from those shown in the above-described embodiments.

In addition, the method of predicting the movement position PP after the predetermined time is not limited to the one described above. That is, the analysis part 22 does not necessarily predict the movement position PP after T seconds on the assumption that the moving object OB moves at a constant speed and in a constant direction. For example, machine learning may be used to predict the movement position PP, or Kalman prediction using a Kalman filter may be used to predict the movement position PP.

What is claimed is:

1. A vehicle body transport system, comprising an unmanned carrier that carries and transports a vehicle body between a plurality of work stations, the vehicle body transport system comprising:

an imaging device comprising an imaging part that is capable of imaging a traveling route of the unmanned carrier and surroundings of the traveling route from above, an analysis part that analyzes an image captured by the imaging part, and a transmission part that transmits a signal to the unmanned carrier, wherein in response to a moving object other than the unmanned carrier that carries the vehicle body being present in the image captured by the imaging part, the analysis part predicts whether a movement trajectory that the vehicle body passes after a predetermined time intersects a movement position where the moving object is located after the predetermined time, and in response to predicting that the movement trajectory and the movement position intersect after the predetermined time, the transmission part transmits an emergency operation signal to the unmanned carrier before the predetermined time elapses.

2. The vehicle body transport system according to claim 1, wherein the imaging part is installed so as to be capable of imaging a point where the unmanned carrier moves non-linearly.

3. The vehicle body transport system according to claim 1, wherein the analysis part:

calculates a grounding position at which the moving object is in contact with a floor based on a center-of-gravity position of the moving object every unit time that is shorter than the predetermined time, in the image captured by the imaging part, and predicts the movement position of the moving object after the predetermined time by acquiring the grounding position in time series.

4. The vehicle body transport system according to claim 2, wherein the analysis part:

calculates a grounding position at which the moving object is in contact with a floor based on a center-of-gravity position of the moving object every unit time that is shorter than the predetermined time, in the image captured by the imaging part, and predicts the movement position of the moving object after the predetermined time by acquiring the grounding position in time series.

* * * * *